United States Patent [19]

Arai

[11] 4,068,246
[45] Jan. 10, 1978

[54] MIRROR AND ASSOCIATED STRUCTURE FOR SINGLE LENS REFLEX CAMERAS

[75] Inventor: Akihiro Arai, Tokyo, Japan

[73] Assignee: Asahi Kogaku Kogyo Kabushiki Kaisha, Japan

[21] Appl. No.: 697,635

[22] Filed: June 18, 1976

[30] Foreign Application Priority Data

July 3, 1975 Japan .................................. 50-82398

[51] Int. Cl.² ............................................. G03B 19/12
[52] U.S. Cl. ..................................... 354/156; 354/152
[58] Field of Search ............... 354/152, 153, 154, 155, 354/156, 157, 158

[56] References Cited

U.S. PATENT DOCUMENTS

| 713,629 | 11/1902 | Garfield | 354/152 |
|---|---|---|---|
| 3,468,232 | 9/1969 | Knapp | 354/156 |
| 3,532,044 | 10/1970 | Shimomura | 354/156 |
| 3,540,365 | 11/1970 | Ishizaka | 354/154 |

FOREIGN PATENT DOCUMENTS

| 877,542 | 4/1953 | Germany | 354/152 |
|---|---|---|---|
| 2,062,217 | 1/1972 | Germany | 354/152 |
| 1,225,482 | 9/1966 | Germany | 354/155 |

Primary Examiner—Edna M. O'Connor
Attorney, Agent, or Firm—Steinberg & Blake

[57] ABSTRACT

A single lens relfex camera is provided with a mirror which has a viewing position, where the mirror is inclined downwardly across an optical axis of a camera objective for directing an image of an object which is to be photographed upwardly to a viewfinder of the camera, and an exposure position, where the mirror is situated above the optical axis in a plane substantially parallel thereto. The mirror has in its viewing position a lower front edge situated beneath the optical axis and an upper rear edge situated above the optical axis rearwardly of the front edge. A structure is operatively connected with the mirror for moving the latter between its viewing and exposure positions, this structure when displacing the mirror from its viewing to its exposure position first retracting the mirror rearwardly while turning the mirror in an angluar direction and then turning the mirror in the opposite angular direction upwardly to its exposure position while when displacing the mirror from its exposure position to its viewing position the structure first turns the mirror and then displaces the mirror forwardly to its viewing position.

15 Claims, 6 Drawing Figures

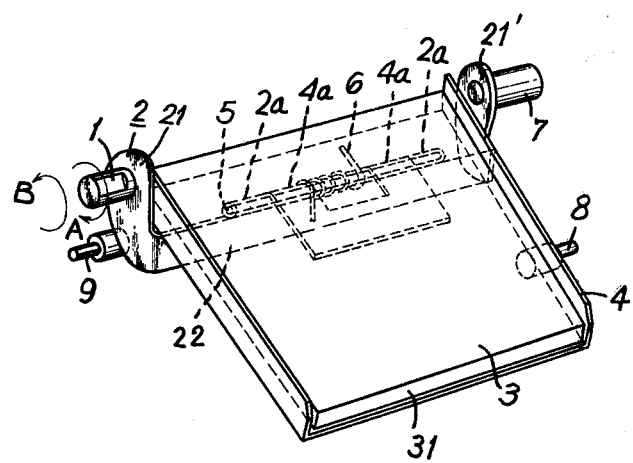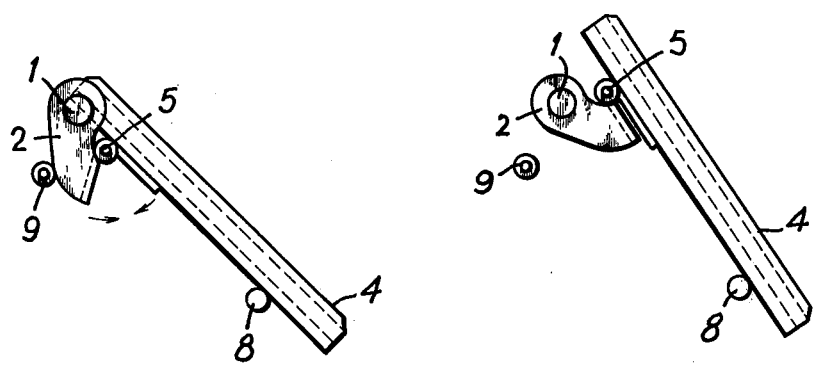

MIRROR AND ASSOCIATED STRUCTURE FOR SINGLE LENS REFLEX CAMERAS

BACKGROUND OF THE INVENTION

The present invention relates to cameras.

In particular, the present invention relates to single lens reflex cameras and more specially to the mirror and associated structure of a single lens reflex camera.

In conventional single lens reflex cameras it is usually impossible to incorporate a mirror of sufficient dimensions. The size of the mirror is necessarily limited by the rear end of the particular objective which is used with a camera. As a result, the amount of light reflected by the mirror to the viewfinder of the camera is in general less than desired and the image seen in the viewfinder is partially darkened because of these deficiencies in the mirror dimensions. This phenomenon, known as the mirror deficiency, is well known.

In order to avoid this problem is has already been proposed to provide various mirror driving mechanisms. For example there is one known mechanism wherein a relatively large mirror is driven around a rotatable shaft which is itself displaced during the driving operation. According to another known construction the rotatable shaft about which the mirror turns is first displaced and then the mirror is turned. Also there is a mechanism according to which the mirror is divided into main and auxiliary mirrors with the main mirror being turned upwardly while the auxiliary mirror is turned downwardly. Howevr, all of these known mechanisms have disadvantages in that the required operations are complex and unreliable, these conventional mirror driving mechanisms generally utilizing complicated linkage and cam mechanisms.

SUMMARY OF THE INVENTION

It is accordingly a primary object of the present invention to provide for a single lens reflex camera a mirror and associated structure which will avoid the above drawbacks.

Thus, it is an object of the present invention to provide for a single lens reflex camera a relatively large mirror which will be capable of directing sufficient light to the viewfinder while at the same time providing for this relatively large mirror a drive which is relatiely simple and highly reliable.

In particular it is an object of the present invention to provide a construction according to which the space required for turning of the mirror of the invention between its viewing and exposure positions is substantially less than the space which would normally be required for this purpose with a conventional structure for a mirror of the same size.

Yet another object of the present invention is to provide a construction which enables the shocks associated with normal mirror operation to be substantially reduced.

Yet another object of the present invention is to provide a mirror structure which makes it possible to utilize a semitransparent mirror portion in a highly effective manner for purposes such as directing part of the light to an exposure meter or the like.

An additional object of the present invention is to provide a structure of this latter type which effectively shields the camera against light which otherwise might enter through the viewfinder.

The object of the present invention also includes the provision of a structure of the above type which is composed of rugged, reliably-operating elements which occupy only a small space and which do not create any particular problems in connection with operation of other camera components.

According to the invention the relatively large mirror is situated in a mirror box and is operated by way of a structure which includes a drive shaft journaled in the mirror box and operatiely connected with a lever means with which a sheet which supports the mirror itself is connected by way of a spring which urges the mirror downwardly, this connection providing a turnable hinge-type of connection. A pair of stops are provided for determining end positions of the lever means and the mirror means itself. In order to bring about an upward movement of the mirror from its viewing position to its exposure position, the lever means is driven so as to displace a wall of the lever means to a location situated closely against the lower surface of the sheet which carries the mirror, and in this way the radius of turning required for the free front edge of the mirror is reduced. During the downward turning of the mirror from the exposure position to the viewing position, the lever means is driven in the opposite direction and when the sheet which carries the mirror engages a stationary mirror stop, the lever continues to turn so as to displace the wall of the lever away from the sheet which carries the mirror, the lever continuing to turn until it engages the lever stop. In its viewing position the mirror is situated substantially in a plane which contains the axis about which the lever means turns and the axis of the hinged connection between the mirror structure and the lever means.

According to a further feature of the present invention, in order to utilize the structure with an exposure meter, the mirror is partially provided with a semitransparent portion while the sheet which carries the mirror is formed with an opening of a dimension corresponding to that of the semitransparent mirror portion. The lever means carries at its wall which extends beneath the mirror a second mirror or reflector of a size great enough to shield the opening in the mirror-supporting sheet and thus to cover the semitransparent portion of the mirror. Beyond the path of travel of the light along the optical axis of the camera objective there is situated a suitable photosensitive means forming part of a photometering structure, with this photosensitive means being exposed to the light of the object to be photographed, with this latter light travelling first through the semitransparent mirror portion and then being reflected by the second mirror or reflector simultaneously with viewing of the object to be photographed at the viewfinder, with the opening in the sheet which carries the mirror and the semitransparent portion thereof being shielded when the mirror is in it exposure position so as to prevent light from travelling undesirably into the camera through the viewfinder thereof.

Thus, according to the invention the single lens reflex camera includes a mirror means which has a viewing position, where the mirror means is inclined downwardly across an optical axis of a camera objective for directing an image of an object which is to be photographed upwardly to a viewfinder of the camera, and an exposure position where the mirror means is situated above the optical axis in a plane substantially parallel thereto. The mirror means has, when in its viewing position, a lower front edge situated beneath the optical axis and an upper rear edge situated above the optical axis rearwardly of the front edge. A moving means is provided for moving the mirror between its positions. This moving means is operatively connected with the mirror means for first retracting the mirror means rearwardly and for then turning the mirror means upwardly when displacing the mirror means for the viewing position to the exposure position thereof, and for turning the mirror means downwardly and then displacing the mirror means forwardly when moving the mirror means from the exposure position to the viewing position.

BRIEF DESCRIPTION OF DRAWINGS

The invention is illustrated by way of example; in the accompanying drawings which from part of this appliation and in which:

FIG. 1 is a partly schematic perspective illustration of one possible embodiment of a structure according to the present invention;

FIG. 2 is a side view of the structure of FIG. 1, FIGS. 1 and 2 showing the mirror means in its viewing position;

FIG. 3 is a side view corresponding to FIG. 2 but showing the position which the parts take after a lever means has turned through an initial angular increment while the mirror is reflected rearwardly up to the position indicated in FIG. 3;

DESCRIPTION OF PREFERRED EMBODIMENTS

Figure 4:
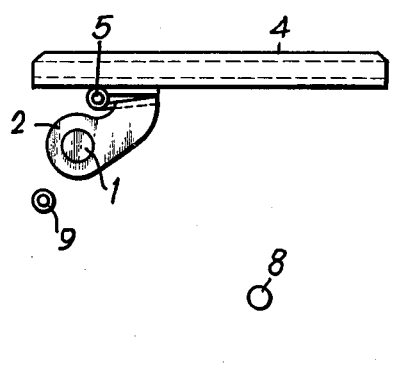
FIG. 4 is a side view corresponding to FIGS. 2 and 3 but showing the position which the parts take at the end of the turning of the mirror means to its exposure position.

Referring first to FIG. 1, there is illustrated therein a lever means 2 which includes a drive shaft 1 fixed to a lever arm 21 of the lever means 2. This lever means 2 includes also a lever arm 21' of the same size and configuration as the arm 21 and remaining at all times in alignment therewith. The arm 21' is fixed with a shaft 7 which is coaxial with the shaft 1, and both of these shafts are supported for turning movement about their common axis which forms a lever axis for the lever means 2, this lever axis remaining stationary with respect to the camera. The shafts 1 and 7 are supported for turning movement about their common axis by bearings respectively carried by opposed vertical side walls of a conventional mirror box having a front wall through which light enters to be received by the mirror means described below. The drive shaft 1 is operatively connected with a driving structure which is well known in the art.

In addition to its arms 21 and 21', the lever means 2 includes a wall 22 which is integral with and extends from the end of each of the arms 21 and 21' which is distant from the lever axis. Thus, the wall 22 and the lever arms 21 and 21' form a one-piece relatively rigid sheet structure of substantially U-shaped configuration as illustrated.

The mirror means of the illustrated structure includes a mirror 3 of a well known type as usually utilized in single lens reflex cameras, this mirror 3 being supported by a sheet metal structure 4 which in itself also is of a well known type. A pivot means is provided for pivotally connecting the mirror means 3, 4 to the lever means 2 for turning movement with respect to the lever means 2 about a pivot axis which is parallel to the lever axis formed by the common axis of the shafts 1 and 7. For this purpose the sheet 4 fixedly carries at its lower surface coaxial tubular hinge sleeves 4a which are spaced from each other and situated between and directly next to a pair of tubular hinge sleeves 2a which are coaxial with the hinge sleeves 4a and which are fixed to the upper edge of the wall 22, as viewed in FIG. 1. In the illustrated example the tubular hinge sleeves 4a ar formed at the ends of a plate of a substantially U-shaped configuration which is fixed to the lower surface of the sheet 4. This construction is shown in dotted lines in FIG. 1. It is to be understood, however, that the pivot means can have any other suitable construction. A hinge pin 5 extends through the series of coaxial sleeves 2a and 4a so that this hinge pin 5 defines the pivot axis about which the lever means 2 and mirror means 3, 4 are capable of pivoting one with respect to the other.

A spring means 6 is provided for urging the mirror means 3, 4 to turn downwardly in a clockwise direction, as viewed in FIGS. 1 and 2, to a location where the mirror means is situated directly next to the wall 22 of the lever means 2. For this purpose the illustrated spring means 6 takes the form of a spring which is coiled about the intermediate portion of the hinge pin 5, between the hinge sleeves 4a, with opposed ends of the spring 6 respectively engaging the sheet 4 and the wall 22 so as to urge the mirror means to turn in a clockwise direction about the pin 5, as viewed in FIG. 2. Thus, in the position of the parts shown in FIGS. 1 and 2 the spring 6 seeks to turn the mirror means further in a clockwise directon beyond the position thereof shown in FIGS. 1 and 2. In this case also although a particular form of the spring means 6 is illustrated in the drawings and described above, it is to be noted that other spring structures may be provided to achieve the same effect, such as, for example, a spring having one end secured to the sheet 4 and an opposed end connected with a stationary component of the camera. A mirror-stop means 8 is fixedly carried buy one of the vertical side walls of the unillustrated mirror box and engages the lower surface of the sheet 4 when the mirror means has the position shown in FIG. 1 and 2 so as to prevent further clockwise turning of the mirror means by the spring means 6. Thus, the mirror-stop means 8 determines the viewing position of the mirror which is illustrated in FIGS. 1 and 2, the mirror means 3, 4 in this viewing position being inclined downwardly across the optical axis of the camera objective with the front edge 31 of the mirror means being situated below the optical axis while the rear upper edge thereof is situated above the optical axis to the rear of the lower front edge 31.

A lever-stop means 9 is carried by the side wall of the mirror box opposed from that which carries the stop means 8, this stop means 9 also being stationary and in the form of a suitable pin which engages the arm 21 of the lever means 2 so as to prevent further turning of the lever means in the clockwise direction shown by the arrow A in FIG. 1 by the unillustrated driving structure. Thus the lever-stop means 9 will determine the position of the lever means 2 when the mirror means is in the viewing position thereof shown in FIGS. 1 and 2. Of course the stops 8 and 9 can be secured to any stationary components of the camera.

The above-described structure operates as follows:

When the mirror means 3, 4 is to be displaced from the viewing position thereof illustrated in FIGS. 1 and 2 up to the exposure position shown in FIG. 4, where the mirror means is situated above the optical axis in a plane parallel thereto, the unillustrated drive means acts on the shaft 1 to turn the latter in the direction of the arrow 3 indicated in FIG. 1. Thus, the lever means 2 will start to turn in a counterclockwise direction, as viewed in FIGS. 1 and 2. During the initial increment of turning of the lever means 2, the wall 22 thereof approaches the mirror means 3,4 while the mirror means and the lever means turn one with respect to the other about the pivot axis determined by the hinge pin 5. The spring 6 maintains the mirror means in engagement with the mirror-stop means 8 which also serves to guide the mirror means while it is retracted upwardly and rearwardly by the lever means as the latter turns from the position of FIG. 2 into the position of FIG. 3 where the wall 22 is situated directly next to the sheet 4 of the mirror means. Thus, during the turning increment of the lever means from the angular position of FIG. 2 into the angular position of FIG. 3, the mirror means remains in engagement with the stop means 8, being sidably guided thereby, while the mirror means is retracted rearwardly and upwardly. Then, while the lever means 2 continues in a counterclockwise direction beyond the position shown in FIG. 3, the mirror means while held against the wall 22 by the spring means 6 turns with the lever means up to the position shown in FIG. 4.

During return of the above-described structure from the exposure position of FIG. 4 to the viewing position of FIGS. 1 and 2, the lever means 2 will first turn angularly in the direction of the arrow A shown in FIG. 1 until the mirror means again engages the mirror-stop means 8, and then the lever means 2 will continue to turn while the mirror means slides forwardly and rearwardly along the stop mean 8 until the lever means engages the lever-stop means 9, and now the miror means has been returned to the viewing position thereof shown in FIGS. 1 and 2.

Figure 5:
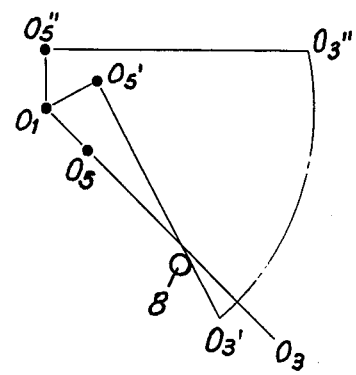
FIG. 5 is a schematic diagram illustrating how the parts operate.

The manner in which the above components operate is shown diagrammatically in FIG. 5. Thus, the lever means turns at the point $O_1$ about the lever axis which is normal to the plane of FIG. 5. At the point $O_5$, the lever means is connected by way of the pivot means to the mirror means which extends between the point $O_5$ and $O_3$. This point $O_3$ corresponds to the lower front edge 31 of the lever means. In the viewing position of the mirror means, the lever axis illustrated by the point $O_1$, the pivot axis illustrated by the point $O_5$, and the lower front edge of the mirror means indicated at $O_3$ in FIG. 5 are all in a common plane. Thus the mirror means when in its viewing position is situated substantially in a plane which contains the lever axis and the pivot axis. As the lever means turns from the position of FIG. 2 into the position of FIG. 3, the point $O_5$ turns to the position $O_{5'}$ shown in FIG. 5, and it will be noted that the lower edge $O_3$ of the mirror means has now been displaced to the location $O_{3'}$. Moreover it will be seen that the mirror means which extends between the points $O_{5'}$ and $O_{3'}$ is situated at this time in a plane perpendicular to a straght line which interconnects the pivot and lever axes and which is in a plane normal to these axes. After retraction of the lower edge of the mirror means from the position $O_3$ to the position $O_{3'}$ in FIG. 5, the mirror means turns with the lever means to the position of FIG. 4, with the pivot axis $O_{5'}$ then turning the position $O_{5''}$ while the lower front edge of the mirror means turns along the dot-dash line arc shown in FIG. 5 from the position $O_3$ to the position $O_{3''}$. It is thus apparent that instead of providing, as is conventional, a turning radius $O_1$–$O_3$, the turning radius for the front edge 31 of the mirror means is determined by the distance between the points $O_1$ and $O_{3'}$, and of course this turning radius is substantially shorter. Of course once the mirror means has been displaced to the exposure position shown in FIG. 4, the light can travel without interference along the optical axis of the objective beneath the mirror means to the film plane.

Although it is preferred for the mirror means when in its viewing position shown in FIGS. 1 and 2, where the light is directed by the mirror means up to the viewfinder, to be located in a plane which contains the lever axis, shown at $O_1$ in FIG. 5, and pivot axis shown at $O_5$ in FIG. 5, with the mirror being initially retracted to be situated in the plane indicated by the line $O_{5'}$ – $O_{3'}$ in FIG. 5, where the mirror means is in a plane perpendicular to the straight line extending between the lever axis and pivot axis, at the end of the retraction movement of the mirror, shown in FIG. 3, nevertheless these relative positions are not absolutely essential and it is possible to achieve a sufficiently advantageous effect even if these relationships are approximated during the operation of the structure of the invention.

Thus, with the structure of the invention the lever means 2 is turned upwardly close to the underside of the sheet 4 of the mirror means during the initial increment of turning of the lever means when the mirror means is displaced from its viewing position to its exposure position, so that even if a mirror of relatively large dimensions is used the radius of turning of the lower front edge 31 of the mirror means is effectively reduced. In addition, during turning of the mirror means together with the lever means after retraction of the mirror means to the position of FIG. 3, while the parts turn from the position of FIG. 3 to the position of FIG. 4, the mirror turns about the lever axis which is situated below the plane of the mirror means by the distance $O_1$ – $O_{5'}$ indicated in FIG. 5, so that as a result during the upward turning of the mirror means the space required by the mirror box is substantially smaller than with previously known arrangements where the turning axis of the mirror means is substantially coincident with the upper rear edge of the mirror means. It is furthermore to be noted that in the particular embodiment of the invention illustrated the upper rear edge of the mirror means is situated upwardly and rearwardly beyond the pivot axis determined by the hinge pin 5, so that this factor also contributes to the relatively large size of the mirror means which can be used with the structure of the invention.

As is apparent from FIG. 5, when the mirror means is first retracted it simultaneously turns or tilts in one angular direction, namely a clockwise direction around the pin or stop means 8, as viewed in FIG. 5, and then at the end of the retraction movement when the mirror means turns with the lever means 2, the mirror means turns in an opposite angular direction, namely a counterclockwise direction, as viewed in FIG. 5, the mirror means now being moved up to the exposure position where it is situated above the optical axis while being substantially parallel thereto.

A further feature of the structure of the invention resides in the fact that the spring means 6 serves to absorb possible shocks during return of the mirror means from its exposure position to its viewing position inasmuch as the spring means 6 is tensioned or stressed to an increasing extend as the lever means returns from the position of FIG. 3 to the position of FIG. 2 while the mirror means remains in engagement with and is guided by the stop means 8 for forward and downward displacement.

While in the illustrated structure the mirror means is pivotally connected directly to the lever means it is also possible to situate other intermediate members operatively between the mirror means and lever means if desired. However, the illustrated structure is preferred because of its simplicity and because of the small space occupied thereby.

Figure 6:
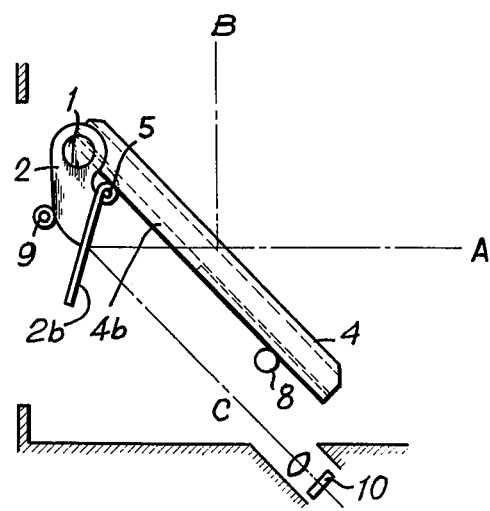
FIG. 6 shows another embodiment of the invention according to which part of the light travels through a semitransparent mirror portion to be utilized for photometric purposes.

According to the embodiment of the invention which is illustrated in FIG. 6, the structure described above is associated with a further structure which is used for photometric purposes such as for the purpose of measuring the light which travels through the objective. Thus, referring to FIG. 6, it will be seen that the sheet 4 of the mirror means is formed with an opening 4b, this opening having a dimension corresponding to a semitransparent portion of the mirror 3, and the semitransparent portion of the mirror 3 coincides with the opening 4b formed in the sheet 4 at the underside of the mirror 3. The wall 22 of the lever means fixedly carries in the embodiment of FIG. 6 a reflector means or second mirror 2b situated behind the opening 4b in the manner illustrated in FIG. 6. A lower portion of the camera carries in the manner shown schematically in FIG. 6 a photosensitive means 10 capable of receiving light for purposes such as measuring the amount of light which travels through the objective. Thus, the photosensitive means 10 is situated beyond the path A of the light traveling through the objective, and also beyond the path B of the light reflected by the mirror means to the viewfinder. Part of the light travelling along the optical axis A is thus reflected to the viewfinder while part of the light travels through the semitransparent mirror portion to be reflected by the reflector means 2b along the path C to the photosensitive means 10. Therefore, when the mirror means is in the viewing position of FIG. 6 it is possible simultaneously with viewing of the object to be photographed to measure the light with a structure which is not situated at the viewfinder.

When the structure of FIG. 6 is moved by the moving means which includes the lever means 2 from the viewing position shown in FIG. 6 to an exposure position corresponding to that shown in FIG. 4, the reflector means 2b, which is opaque, turns up to the underside of the sheet 4 and is large enough to cover the opening 4b as well as to cover the semitransparent mirror portion, so that any light traveling into the camera through the viewfinder is necessarily prevented from travelling downwardly beyond the mirror means when the latter is in the exposure position corresponding to that illustrated in FIG. 4. Thus the reflector means 2b also acts effectively as a shield to prevent undesirable light from entering into the camera through the viewfinder during exposure of film.

It is thus apparent from the above that by way of the present invention the mirror and its associated structure is capable of operating in a reliable manner and incorporates only relatively simple components while at the same time permitting a mirror of relatively large dimensions to be utilized and while also permitting a second mirror or reflector 2b to be utilized for light-measuring purposes or the like.

What is claimed is:
1. In a single lens reflex camera, mirror means having a viewing position, where said mirror means is inclined downwardly across an optical axis of a camera objective for directing an image of an object which is to be photographed upwardly to a viewfinder of the camera, and an exposure position, where said mirror means is situated above the optical axis while being substantially parallel thereto, said mirror means when in said viewing position thereof having a lower front edge situated beneath the optical axis and an upper rear edge situated above the optical axis rearwardly of said front edge, and moving means for moving said mirror means between said positions thereof, said moving means being operatively connected with said mirror means for first retracting said mirror means rearwardly while turning said mirror means in one angular direction and for then turning said mirror means in an opposite angular direction upwardly when displacing said mirror means from said viewing position to said exposure position and for turning said mirror means downwardly and then displacing said mirror means fowardly when moving said mirror means from said exposure position to said viewing position.

2. The combination of claim 1 and wherein a mirror-stop means engages said mirror means for guiding the same during the initial retraction thereof when said moving means operates to move said mirror means from said viewing to said exposure position thereof and during the final forward displacement of said mirror means when said moving means returns said mirror means from said exposure position to said viewing position.

3. In a single lens reflex camera, mirror means having a viewing position, where said mirror means is inclined downwardly across an optical axis of a camera objective for directing an image of an object which is to be photographed upwardly to a viewfinder of the camera, and an exposure position, where said mirror means is situated above the optical axis while being substantially parallel thereto, said mirror means when in said viewing position thereof having a lower front edge situated beneath the optical axis and an upper rear edge situated above the optical axis rearwardly of said front edge, and moving means for moving said mirror means between said positions thereof, said moving means being operatively connected with said mirror means for first retracting said mirror means rearwardly and for then turning said mirror means upwardly when displacing said mirror means from said viewing position to said exposure position and for turning said mirror means downwardly and then displacing said mirror means forwardly when moving said mirror means from said exposure position to said viewing position, a mirror stop means engaging said mirror means for guiding the same during the initial retraction thereof when said moving means operates to move said mirror means from said viewing to said exposure position thereof and during the final forward displacement of said mirror means when said moving means returns said mirror means from said exposure position to said viewing position, said moving means including a lever means turnable about a lever axis which remains stationary with respect to the camera and a pivot means pivotally connecting said mirror means to said lever means for turning movement with respect thereto about a pivot axis which is parallel to said lever axis.

4. The combination of claim 3 and wherein said mirror means has an at least partly light-reflecting surface which, when said mirror means is in said viewing position thereof, is situated adjacent and substantially parallel to a plane which contains said lever axis and pivot axis.

5. The combination of claim 4 and wherein during movement of said mirror means from said viewing position to said exposure position thereof said lever means first turns through a given angular increment about said lever axis while said mirror means and lever means pivot one with respect to the other about said pivot axis during the initial retraction of said mirror means, and said mirror means then remaining stationary with respect to said lever means while the latter turns through a second increment during turning of said mirror means upwardly away from said stop means to said exposure position.

6. The combination of claim 5 and wherein a spring means is operatively connected with said mirror means for urging the latter to turn about said pivot axis to the position which said mirror mens has with respect to said lever means at the end of the turning of said lever means through said given increment during the initial retraction of said mirror means when the latter is moved from said viewing to said exposure position thereof.

7. The combination of claim 5 and wherein at the end of the retraction of said mirror means when said lever means has turned through said given increment said surface of said mirror means is situated substantially adjacent and parallel to a plane which is perpendicular to a straight line situated in a plane normal to said pivot and lever axes and extending between said pivot and lever axes.

8. The combination of claim 5 and wherein said rear edge of said mirror means is situated rearwardly beyond said pivot axis.

9. The combination of claim 5 and wherein said lever means includes at least one lever arm turnable about said lever axis and having an end distant therefrom and an elongated wall fixed to and extending from said end of said lever arm beneath and along said mirror means, said pivot means connecting said mirror means to said wall for turning movement with respect thereto.

10. The combination of claim 9 and wherein said wall is angularly displaced from said mirror means when the latter is in said viewing position thereof while during retraction of said mirror means and initial displacement thereof from said viewing to said exposure position said mirror means and wall turn one with respect to the other about said pivot axis while said wall approaches said mirror means and engages the latter at the end of said given increment of turning of said lever means, said mirror means being supported by said wall during said second turning increment of said lever means while said mirror means is displaced to said exposure position.

11. The combination of claim 10 and wherein a lever-stop means engages said lever arm when said mirror means is in said viewing position thereof.

12. The combination of claim 10 and wherein said mirror means has a semitransparent portion through which light can in part travel while the remaining light is reflected from said semitransparent portion upwardly toward the viewfinder when said mirror means is in said viewing position thereof, and reflector means situated behind said semitransparent portion of said mirror means when the latter is in said viewing position thereof for reflecting light which travels through said semitransparent portion downwardly toward a means for receiving the thus-reflected light.

13. The combination of claim 12 and wherein said reflector means is connected by said pivot means to said lever means and mirror means for turning movement with respect to said mirror means about said pivot axis.

14. The combination of claim 13 and wherein said reflector means is turned by said lever means into engagement with said mirror means during the initial retraction movement thereof while said mirror means is moved from said viewing toward said exposure position thereof.

15. The combination of claim 14 and wherein said reflector means is large enough to cover said semitransparent portion of said mirror means when said lever means has turned through said given increment during the initial retraction of said mirror means when the latter moves from said viewing toward said exposure position thereof.

* * * * *